US008572576B2

(12) United States Patent
Elvanoglu et al.

(10) Patent No.: US 8,572,576 B2
(45) Date of Patent: Oct. 29, 2013

(54) EXECUTING DYNAMICALLY ASSIGNED FUNCTIONS WHILE PROVIDING SERVICES

(75) Inventors: Ferhan Elvanoglu, Redmond, WA (US); Shaun D. Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1463 days.

(21) Appl. No.: 11/347,448

(22) Filed: Feb. 3, 2006

(65) Prior Publication Data

US 2006/0150140 A1 Jul. 6, 2006

Related U.S. Application Data

(63) Continuation of application No. 10/062,045, filed on Jan. 31, 2002, now Pat. No. 7,024,662.

(60) Provisional application No. 60/275,809, filed on Mar. 14, 2001.

(51) Int. Cl.
*G06F 9/44* (2006.01)
(52) U.S. Cl.
USPC .......................... 717/127; 717/101; 717/120
(58) Field of Classification Search
USPC ........................................................ 717/127
See application file for complete search history.

(56) References Cited

U.S. PATENT DOCUMENTS

| 5,218,680 | A | 6/1993 | Farrell |
| 5,440,744 | A | 8/1995 | Jacobson |
| 5,446,880 | A | 8/1995 | Balgeman |
| 5,485,409 | A | 1/1996 | Gupta |
| 5,487,141 | A | 1/1996 | Cain |
| 5,493,692 | A | 2/1996 | Theimer |
| 5,544,285 | A | 8/1996 | Glaser |

(Continued)

FOREIGN PATENT DOCUMENTS

| CA | 2 428 481 | 12/2003 |
| EP | 0 893 920 | 1/1999 |

(Continued)

OTHER PUBLICATIONS

"Secure Soccket Layer (SSL)", IBM, Jan 31, 2001, <http://pic.dhe.ibm.com/infocenter/wasinfo/v7r0/index.jsp?topic=%2Fcom.ibm.websphere.edge.doc%2Fcp%2Fadmingd35.htm> pp. 1-6.*

(Continued)

*Primary Examiner* — Thuy Dao
*Assistant Examiner* — Samuel Hayim
(74) *Attorney, Agent, or Firm* — L. Alan Collins; Collins & Collins Intellectual, LLC

(57) ABSTRACT

Methods, systems, and computer program products for applying actions during server system processing. Functional processing blocks where actions may be applied to a service request are identified. actions are dynamically associated with functional processing blocks. During execution of a functional processing block, a check is performed to determine whether an action is associated with the functional processing block. If an action is associated with a functional processing block, the action is applied during the functional processing block's execution. An evaluation may be performed to determine if an action should be applied before or after the functional processing block. The server system may comprise an XML data repository, providing access to XML data, based on identity information which is received with a client system request. A portion of the server system may be described in accordance with an XML schema.

17 Claims, 9 Drawing Sheets

(56) References Cited

U.S. PATENT DOCUMENTS

| | | | |
|---|---|---|---|
| 5,544,302 A | 8/1996 | Nguyen | 715/837 |
| 5,634,053 A | 5/1997 | Noble | |
| 5,634,129 A | 5/1997 | Dickinson | 719/315 |
| 5,640,504 A | 6/1997 | Johnson, Jr. | |
| 5,640,569 A | 6/1997 | Miller | |
| 5,666,534 A | 9/1997 | Gilbert | |
| 5,684,950 A | 11/1997 | Dare | |
| 5,687,376 A * | 11/1997 | Celi et al. | 717/127 |
| 5,691,917 A * | 11/1997 | Harrison | 717/127 |
| 5,729,682 A | 3/1998 | Marquis | |
| 5,742,905 A | 4/1998 | Pepe | |
| 5,748,890 A | 5/1998 | Goldberg | |
| 5,754,111 A | 5/1998 | Garcia | |
| 5,754,175 A | 5/1998 | Koppolu | |
| 5,778,227 A | 7/1998 | Jordan | 395/682 |
| 5,787,283 A * | 7/1998 | Chin et al. | 717/101 |
| 5,787,412 A | 7/1998 | Bosch | |
| 5,787,427 A | 7/1998 | Benatar et al. | 707/9 |
| 5,790,785 A | 8/1998 | Klug | |
| 5,809,509 A | 9/1998 | Blackman | |
| 5,819,092 A | 10/1998 | Ferguson | |
| 5,826,252 A * | 10/1998 | Wolters et al. | 717/101 |
| 5,835,722 A | 11/1998 | Bradshaw et al. | 709/225 |
| 5,862,325 A | 1/1999 | Reed | |
| 5,864,848 A | 1/1999 | Horvitz | |
| 5,867,712 A * | 2/1999 | Shaw et al. | 717/127 |
| 5,867,799 A * | 2/1999 | Lang et al. | 707/1 |
| 5,870,739 A | 2/1999 | Davis | |
| 5,870,759 A | 2/1999 | Bauer | |
| 5,872,926 A | 2/1999 | Levac et al. | 395/200.36 |
| 5,898,870 A | 4/1999 | Okuda | |
| 5,911,139 A | 6/1999 | Jain | |
| 5,911,143 A | 6/1999 | Deinhart et al. | 707/103 |
| 5,926,810 A | 7/1999 | Noble | |
| 5,930,801 A | 7/1999 | Falkenhainer | |
| 5,933,820 A | 8/1999 | Beier et al. | 707/1 |
| 5,937,189 A * | 8/1999 | Branson et al. | 717/101 |
| 5,944,823 A | 8/1999 | Jade | |
| 5,956,715 A | 9/1999 | Glasser et al. | 707/9 |
| 5,956,730 A | 9/1999 | Burroughs | |
| 5,963,976 A | 10/1999 | Ogawa et al. | 711/148 |
| 5,974,416 A | 10/1999 | Anand | |
| 5,974,417 A | 10/1999 | Bracho | |
| 5,983,234 A | 11/1999 | Tietjen | |
| 5,983,273 A | 11/1999 | White | |
| 5,987,454 A | 11/1999 | Hobbs | |
| 5,990,883 A | 11/1999 | Byrne | |
| 5,999,932 A | 12/1999 | Paul | |
| 6,003,079 A | 12/1999 | Friedrich | |
| 6,011,537 A * | 1/2000 | Slotznick | 715/733 |
| 6,016,394 A | 1/2000 | Walker | |
| 6,018,343 A | 1/2000 | Wang | |
| 6,021,403 A | 2/2000 | Horvitz | |
| 6,023,223 A | 2/2000 | Baxter | |
| 6,023,765 A | 2/2000 | Kuhn | 726/4 |
| 6,044,224 A | 3/2000 | Radia et al. | 395/710 |
| 6,044,372 A | 3/2000 | Rothfus | |
| 6,047,307 A | 4/2000 | Radko | |
| 6,047,327 A | 4/2000 | Tso | |
| 6,049,821 A * | 4/2000 | Theriault et al. | 709/203 |
| 6,052,720 A | 4/2000 | Traversat | |
| 6,065,012 A | 5/2000 | Balsara | |
| 6,078,955 A | 6/2000 | Konno | |
| 6,081,840 A | 6/2000 | Zhao | |
| 6,088,451 A | 7/2000 | He | |
| 6,088,675 A | 7/2000 | MacKenty et al. | 704/270 |
| 6,088,717 A | 7/2000 | Reed | |
| 6,092,101 A | 7/2000 | Birrell et al. | 709/206 |
| 6,101,480 A | 8/2000 | Conmy | |
| 6,106,573 A | 8/2000 | Mahalingaiah | |
| 6,119,122 A | 9/2000 | Bunnell | |
| 6,122,348 A | 9/2000 | French-St. George et al. | |
| 6,122,629 A | 9/2000 | Walker | |
| 6,141,778 A | 10/2000 | Kane | |
| 6,144,996 A * | 11/2000 | Starnes et al. | 709/217 |
| 6,148,290 A | 11/2000 | Dan | |
| 6,148,301 A | 11/2000 | Rosenthal | |
| 6,148,302 A | 11/2000 | Beylin et al. | 707/102 |
| 6,151,624 A | 11/2000 | Teare | |
| 6,154,876 A | 11/2000 | Haley et al. | 717/4 |
| 6,161,125 A | 12/2000 | Traversat | |
| 6,161,139 A | 12/2000 | Win | |
| 6,163,794 A | 12/2000 | Lange | |
| 6,167,402 A | 12/2000 | Yeager | 707/10 |
| 6,167,408 A | 12/2000 | Cannon | |
| 6,185,551 B1 | 2/2001 | Birrell | |
| 6,189,032 B1 | 2/2001 | Susaki et al. | 709/225 |
| 6,192,380 B1 | 2/2001 | Light | |
| 6,192,408 B1 | 2/2001 | Vahalia et al. | 709/229 |
| 6,195,662 B1 | 2/2001 | Ellis et al. | 707/103 |
| 6,199,081 B1 | 3/2001 | Meyerzon et al. | 707/513 |
| 6,202,066 B1 | 3/2001 | Barkley et al. | 707/9 |
| 6,223,207 B1 | 4/2001 | Lucovsky et al. | 709/107 |
| 6,226,642 B1 * | 5/2001 | Beranek et al. | 348/211.13 |
| 6,226,792 B1 * | 5/2001 | Goiffon et al. | 717/120 |
| 6,243,830 B1 | 6/2001 | Nakatsugawa | |
| 6,247,026 B1 | 6/2001 | Waldo | |
| 6,253,204 B1 | 6/2001 | Glass | |
| 6,263,498 B1 * | 7/2001 | Alcorn et al. | 717/120 |
| 6,266,690 B1 | 7/2001 | Shankarappa | |
| 6,269,369 B1 | 7/2001 | Robertson | |
| 6,272,506 B1 | 8/2001 | Bell | |
| 6,275,824 B1 | 8/2001 | O'Flaherty | |
| 6,279,111 B1 | 8/2001 | Jensenworth | |
| 6,282,548 B1 | 8/2001 | Burner et al. | 707/104 |
| 6,282,698 B1 * | 8/2001 | Baker et al. | 717/120 |
| 6,282,709 B1 | 8/2001 | Reha | |
| 6,308,216 B1 | 10/2001 | Goldszmidt | |
| 6,308,273 B1 | 10/2001 | Goertzel | |
| 6,314,093 B1 | 11/2001 | Mann | |
| 6,314,447 B1 | 11/2001 | Lea | |
| 6,314,555 B1 * | 11/2001 | Ndumu et al. | 717/101 |
| 6,317,783 B1 | 11/2001 | Freishtat | |
| 6,317,868 B1 * | 11/2001 | Grimm et al. | 717/127 |
| 6,324,544 B1 | 11/2001 | Alam | |
| 6,327,574 B1 | 12/2001 | Kramer | |
| 6,330,610 B1 | 12/2001 | Docter | |
| 6,334,151 B1 | 12/2001 | Bolam | |
| 6,336,118 B1 | 1/2002 | Hammond | 707/103 |
| 6,336,119 B1 | 1/2002 | Banavar | |
| 6,336,147 B1 | 1/2002 | Brownell et al. | 719/310 |
| 6,343,287 B1 | 1/2002 | Kumar | |
| 6,343,324 B1 | 1/2002 | Hubis et al. | 709/229 |
| 6,349,302 B1 | 2/2002 | Aoyama et al. | 707/101 |
| 6,349,307 B1 | 2/2002 | Chen | 707/103 |
| 6,351,744 B1 | 2/2002 | Landresse | 707/8 |
| 6,351,843 B1 | 2/2002 | Berkley et al. | 717/128 |
| 6,356,940 B1 | 3/2002 | Short | 709/217 |
| 6,370,537 B1 | 4/2002 | Gilbert et al. | 707/101 |
| 6,377,952 B1 | 4/2002 | Inohara et al. | 707/101 |
| 6,381,465 B1 | 4/2002 | Chern | |
| 6,397,246 B1 * | 5/2002 | Wolfe | 709/217 |
| 6,401,085 B1 | 6/2002 | Gershman | |
| 6,405,191 B1 | 6/2002 | Bhatt | |
| 6,405,364 B1 * | 6/2002 | Bowman-Amuah | 717/101 |
| 6,414,635 B1 | 7/2002 | Stewart | |
| 6,415,322 B1 | 7/2002 | Jaye | |
| 6,442,549 B1 | 8/2002 | Schneider | |
| 6,453,317 B1 | 9/2002 | LaCost | |
| 6,457,066 B1 | 9/2002 | Mein et al. | |
| 6,459,913 B2 | 10/2002 | Cloutier | |
| 6,466,232 B1 | 10/2002 | Newell | |
| 6,470,450 B1 | 10/2002 | Langford | |
| 6,480,830 B1 | 11/2002 | Ford | |
| 6,480,850 B1 | 11/2002 | Veldhuisen | |
| 6,480,860 B1 | 11/2002 | Monday | |
| 6,480,885 B1 | 11/2002 | Olivier | |
| 6,487,584 B1 | 11/2002 | Bunney | |
| 6,490,721 B1 | 12/2002 | Gorshkov et al. | 717/130 |
| 6,505,167 B1 | 1/2003 | Horvitz | |
| 6,510,439 B1 | 1/2003 | Rangarajan | |
| 6,516,315 B1 | 2/2003 | Gupta | |
| 6,516,341 B2 | 2/2003 | Shaw | |
| 6,519,571 B1 | 2/2003 | Guheen et al. | 705/14 |

(56) References Cited

U.S. PATENT DOCUMENTS

| | | |
|---|---|---|
| 6,526,438 B1 | 2/2003 | Bienvenu |
| 6,539,481 B1 | 3/2003 | Takahashi |
| 6,542,515 B1 | 4/2003 | Kumar |
| 6,542,845 B1 | 4/2003 | Grucci et al. ............... 702/122 |
| 6,542,912 B2 | 4/2003 | Meltzer |
| 6,542,923 B2 | 4/2003 | Nguyen |
| 6,543,317 B1 | 4/2003 | Rinner |
| 6,553,427 B1 | 4/2003 | Chang et al. ............... 719/314 |
| 6,556,995 B1 | 4/2003 | Child |
| 6,566,995 B2 | 5/2003 | Furuuchi |
| 6,571,279 B1 | 5/2003 | Herz |
| 6,574,631 B1 | 6/2003 | Subramanian et al. |
| 6,574,655 B1 | 6/2003 | Libert |
| 6,581,095 B1 | 6/2003 | Kim |
| 6,584,564 B2 | 6/2003 | Olkin |
| 6,591,260 B1 | 7/2003 | Schwarzhoff |
| 6,594,666 B1 | 7/2003 | Biswas |
| 6,594,672 B1 | 7/2003 | Lampson |
| 6,601,016 B1 | 7/2003 | Brown |
| 6,601,075 B1 | 7/2003 | Huang |
| 6,601,233 B1 * | 7/2003 | Underwood ............... 717/101 |
| 6,604,099 B1 | 8/2003 | Chung |
| 6,604,209 B1 | 8/2003 | Grucci et al. ............... 714/38 |
| 6,609,148 B1 | 8/2003 | Salo |
| 6,618,716 B1 | 9/2003 | Horvitz |
| 6,622,160 B1 | 9/2003 | Horvitz |
| 6,633,898 B1 | 10/2003 | Seguchi |
| 6,643,650 B1 | 11/2003 | Slaughter |
| 6,643,652 B2 | 11/2003 | Helgeson |
| 6,651,217 B1 | 11/2003 | Kennedy |
| 6,654,747 B1 | 11/2003 | Van Huben et al. ............ 707/10 |
| 6,662,340 B2 | 12/2003 | Rawat |
| 6,662,357 B1 * | 12/2003 | Bowman-Amuah ......... 717/120 |
| 6,665,756 B2 | 12/2003 | Abramson |
| 6,678,682 B1 | 1/2004 | Jenkins et al. ............... 707/9 |
| 6,678,715 B1 | 1/2004 | Ando |
| 6,684,204 B1 | 1/2004 | Lal ............................. 707/3 |
| 6,686,838 B1 | 2/2004 | Rezvani |
| 6,694,429 B1 | 2/2004 | Kalmanek, Jr. |
| 6,697,809 B2 | 2/2004 | Chen |
| 6,697,865 B1 | 2/2004 | Howard |
| 6,704,024 B2 | 3/2004 | Robotham ................... 345/581 |
| 6,708,137 B2 | 3/2004 | Carley |
| 6,711,585 B1 | 3/2004 | Copperman |
| 6,711,612 B1 | 3/2004 | Blumenau et al. ............ 709/223 |
| 6,714,967 B1 | 3/2004 | Horvitz |
| 6,718,535 B1 * | 4/2004 | Underwood ................... 717/120 |
| 6,721,941 B1 * | 4/2004 | Morshed et al. ............... 717/127 |
| 6,731,940 B1 | 5/2004 | Nagendran |
| 6,732,080 B1 | 5/2004 | Blants |
| 6,738,767 B1 | 5/2004 | Chung |
| 6,741,980 B1 | 5/2004 | Langseth |
| 6,745,011 B1 | 6/2004 | Hendrickson |
| 6,748,417 B1 | 6/2004 | Helland |
| 6,754,470 B2 | 6/2004 | Hendrickson |
| 6,757,720 B1 | 6/2004 | Weschler |
| 6,757,898 B1 | 6/2004 | Ilsen |
| 6,766,362 B1 | 7/2004 | Miyasaka |
| 6,772,216 B1 | 8/2004 | Ankireddipally |
| 6,789,077 B1 | 9/2004 | Slaughter |
| 6,789,126 B1 | 9/2004 | Saulpaugh |
| 6,792,446 B2 | 9/2004 | Merchant |
| 6,792,466 B1 | 9/2004 | Saulpaugh |
| 6,792,605 B1 | 9/2004 | Roberts |
| 6,807,558 B1 * | 10/2004 | Hassett et al. ............... 709/203 |
| 6,816,878 B1 | 11/2004 | Zimmers |
| 6,816,886 B2 | 11/2004 | Elvanoglu |
| 6,820,082 B1 | 11/2004 | Cook |
| 6,820,204 B1 | 11/2004 | Desai |
| 6,823,369 B2 | 11/2004 | Leach |
| 6,823,458 B1 | 11/2004 | Lee et al. ..................... 726/16 |
| 6,823,495 B1 | 11/2004 | Vedula |
| 6,829,593 B1 | 12/2004 | Ritter |
| 6,832,237 B1 | 12/2004 | Christensen et al. ......... 709/200 |
| 6,839,733 B1 | 1/2005 | Lange |
| 6,850,975 B1 | 2/2005 | Danneels |
| 6,850,979 B1 | 2/2005 | Saulpaugh |
| 6,857,013 B2 | 2/2005 | Ramberg |
| 6,862,594 B1 | 3/2005 | Saulpaugh |
| 6,868,447 B1 | 3/2005 | Slaughter |
| 6,882,706 B2 | 4/2005 | Andrew |
| 6,892,201 B2 | 5/2005 | Brown |
| 6,898,618 B1 | 5/2005 | Slaughter |
| 6,907,457 B2 | 6/2005 | Merrell et al. ............... 709/223 |
| 6,907,465 B1 | 6/2005 | Tsai |
| 6,911,143 B2 | 6/2005 | Janik |
| 6,912,600 B2 | 6/2005 | Van Brero |
| 6,917,373 B2 | 7/2005 | Vong et al. ................... 715/840 |
| 6,917,937 B1 | 7/2005 | Rubendall |
| 6,917,976 B1 | 7/2005 | Slaughter |
| 6,918,084 B1 | 7/2005 | Slaughter |
| 6,925,307 B1 | 8/2005 | Mamdani |
| 6,925,481 B2 | 8/2005 | Singhal |
| 6,931,434 B1 | 8/2005 | Donoho |
| 6,934,740 B1 | 8/2005 | Lawande |
| 6,957,199 B1 | 10/2005 | Fisher |
| 6,958,984 B2 | 10/2005 | Kotzin |
| 6,976,078 B1 | 12/2005 | Icken |
| 6,980,993 B2 | 12/2005 | Horvitz |
| 6,981,247 B2 * | 12/2005 | Weinberg et al. ............ 717/127 |
| 6,985,958 B2 | 1/2006 | Lucovsky |
| 6,986,145 B2 | 1/2006 | Gangopadhyay |
| 6,990,513 B2 | 1/2006 | Belfiore |
| 6,993,502 B1 | 1/2006 | Gryglewicz |
| 7,002,942 B2 | 2/2006 | Kotzin |
| 7,017,016 B2 | 3/2006 | Chujo ........................... 711/147 |
| 7,024,662 B2 | 4/2006 | Elvanoglu |
| 7,024,692 B1 | 4/2006 | Schanze |
| 7,027,051 B2 | 4/2006 | Alford |
| 7,028,312 B1 | 4/2006 | Merrick |
| 7,031,945 B1 | 4/2006 | Donner |
| 7,062,539 B2 | 6/2006 | Leach |
| 7,062,642 B1 | 6/2006 | Langrind |
| 7,072,843 B2 | 7/2006 | Menninger |
| 7,072,967 B1 | 7/2006 | Saulpaugh |
| 7,113,771 B2 | 9/2006 | Kotzin |
| 7,127,328 B2 | 10/2006 | Ransom |
| 7,133,869 B2 | 11/2006 | Bryan |
| 7,136,859 B2 | 11/2006 | Lucovsky |
| 7,136,908 B2 | 11/2006 | Cline |
| 7,143,118 B2 | 11/2006 | Eichstaedt |
| 7,149,806 B2 | 12/2006 | Perkins |
| 7,170,857 B2 | 1/2007 | Stephens |
| 7,191,236 B2 | 3/2007 | Simpson-Young |
| 7,203,906 B2 | 4/2007 | Abbott |
| 7,206,788 B2 | 4/2007 | Horvitz |
| 7,210,147 B1 | 4/2007 | Hipp et al. |
| 7,216,287 B2 | 5/2007 | Colson |
| 7,222,306 B2 | 5/2007 | Kaasila |
| 7,246,122 B2 | 7/2007 | Lucovsky |
| 7,249,159 B1 | 7/2007 | Horvitz |
| 7,250,846 B2 | 7/2007 | Ebling |
| 7,260,601 B1 | 8/2007 | Day |
| 7,284,197 B2 | 10/2007 | Lucovsky |
| 7,284,271 B2 | 10/2007 | Lucovsky |
| 7,472,349 B1 * | 12/2008 | Srivastava et al. ............ 707/10 |
| 7,487,233 B2 | 2/2009 | Iwamoto |
| 7,721,110 B2 | 5/2010 | Kouznetsov |
| 7,921,155 B2 | 4/2011 | Harrow |
| 2001/0000958 A1 | 5/2001 | Ulrich |
| 2001/0023421 A1 | 9/2001 | Numao |
| 2001/0029470 A1 | 10/2001 | Schultz |
| 2001/0044275 A1 | 11/2001 | Yamaguchi |
| 2001/0044827 A1 | 11/2001 | Zhuk |
| 2001/0047385 A1 | 11/2001 | Tuatini ......................... 370/203 |
| 2002/0012327 A1 | 1/2002 | Okada |
| 2002/0013711 A1 | 1/2002 | Ahuja |
| 2002/0013788 A1 | 1/2002 | Pennell |
| 2002/0015042 A1 * | 2/2002 | Robotham et al. ............ 345/581 |
| 2002/0016173 A1 | 2/2002 | Hunzinger |
| 2002/0019828 A1 | 2/2002 | Mortl |
| 2002/0026426 A1 | 2/2002 | Bennett |
| 2002/0029256 A1 | 3/2002 | Zintel et al. ................... 709/218 |
| 2002/0035533 A1 | 3/2002 | Mache et al. ................. 705/37 |

(56) References Cited

U.S. PATENT DOCUMENTS

| | | |
|---|---|---|
| 2002/0038455 A1 | 3/2002 | Srinivasan |
| 2002/0040369 A1 | 4/2002 | Multer |
| 2002/0042846 A1 | 4/2002 | Bottan |
| 2002/0049749 A1 | 4/2002 | Helgeson |
| 2002/0049902 A1 | 4/2002 | Rhodes |
| 2002/0055951 A1 | 5/2002 | Shigetomi et al. ......... 707/501.1 |
| 2002/0059342 A1 | 5/2002 | Gupta |
| 2002/0063732 A1 | 5/2002 | Mansikkaniemi |
| 2002/0065881 A1 | 5/2002 | Mansikkaniemi |
| 2002/0065884 A1 | 5/2002 | Donoho |
| 2002/0069298 A1 | 6/2002 | Birkler |
| 2002/0078204 A1 | 6/2002 | Newell |
| 2002/0078378 A1 | 6/2002 | Burnett |
| 2002/0080156 A1 | 6/2002 | Abbott |
| 2002/0083048 A1 | 6/2002 | Tenorio |
| 2002/0083073 A1 | 6/2002 | Vaidya |
| 2002/0083158 A1 | 6/2002 | Abbott |
| 2002/0085579 A1 | 7/2002 | Sullivan |
| 2002/0087397 A1 | 7/2002 | Mazza |
| 2002/0090934 A1 | 7/2002 | Mitchelmore |
| 2002/0095399 A1 | 7/2002 | Devine |
| 2002/0099573 A1 | 7/2002 | Koguchi |
| 2002/0099593 A1 | 7/2002 | Kraft |
| 2002/0099817 A1 | 7/2002 | Abbott |
| 2002/0103661 A1 | 8/2002 | Albazz |
| 2002/0107985 A1 | 8/2002 | Hwang |
| 2002/0116232 A1 | 8/2002 | Rapp |
| 2002/0116642 A1 | 8/2002 | Joshi |
| 2002/0120685 A1 | 8/2002 | Srivastava |
| 2002/0124182 A1 | 9/2002 | Bacso |
| 2002/0129000 A1 | 9/2002 | Pillai |
| 2002/0129016 A1 | 9/2002 | Christfort |
| 2002/0129024 A1 | 9/2002 | Lee |
| 2002/0129213 A1 | 9/2002 | Goudie |
| 2002/0131428 A1 | 9/2002 | Pecus |
| 2002/0133477 A1 | 9/2002 | Abel |
| 2002/0133506 A1 | 9/2002 | Yamato |
| 2002/0133535 A1 | 9/2002 | Lucovsky |
| 2002/0133627 A1 | 9/2002 | Maes |
| 2002/0133752 A1 | 9/2002 | Hand ............................ 714/38 |
| 2002/0152053 A1 | 10/2002 | Roy |
| 2002/0154161 A1 | 10/2002 | Friedman |
| 2002/0157007 A1 | 10/2002 | Sashihara |
| 2002/0161838 A1 | 10/2002 | Pickover |
| 2002/0169876 A1 | 11/2002 | Curie |
| 2002/0184092 A1 | 12/2002 | Cherry |
| 2002/0184344 A1 | 12/2002 | Elvanoglu |
| 2003/0004874 A1 | 1/2003 | Ludwig |
| 2003/0018771 A1 | 1/2003 | Vinberg |
| 2003/0023263 A1 | 1/2003 | Krolik |
| 2003/0023623 A1 | 1/2003 | Horvitz |
| 2003/0041000 A1 | 2/2003 | Zajac |
| 2003/0041065 A1 | 2/2003 | Lucovsky |
| 2003/0041076 A1 | 2/2003 | Lucovsky |
| 2003/0046238 A1 | 3/2003 | Nonaka |
| 2003/0050911 A1 | 3/2003 | Lucovsky |
| 2003/0061081 A1 | 3/2003 | Kellond |
| 2003/0061211 A1 | 3/2003 | Shultz |
| 2003/0061365 A1 | 3/2003 | White |
| 2003/0069887 A1 | 4/2003 | Lucovsky |
| 2003/0074247 A1 | 4/2003 | Dick |
| 2003/0074423 A1 | 4/2003 | Mayberry et al. ............ 709/219 |
| 2003/0101190 A1 | 5/2003 | Horvitz |
| 2003/0115228 A1 | 6/2003 | Horvitz |
| 2003/0120785 A1 | 6/2003 | Young |
| 2003/0131069 A1 | 7/2003 | Lucovsky |
| 2003/0131073 A1 | 7/2003 | Lucovsky |
| 2003/0131142 A1 | 7/2003 | Horvitz |
| 2003/0133553 A1 | 7/2003 | Khakoo |
| 2003/0135411 A1 | 7/2003 | Ushiki |
| 2003/0135441 A1 | 7/2003 | Ginsberg |
| 2003/0135556 A1 | 7/2003 | Holdsworth |
| 2003/0140112 A1 | 7/2003 | Ramachandran |
| 2003/0149646 A1 | 8/2003 | Chen |
| 2003/0149696 A1 | 8/2003 | Nelson |
| 2003/0149781 A1 | 8/2003 | Yared |
| 2003/0154476 A1 | 8/2003 | Abbott |
| 2003/0177135 A1 | 9/2003 | Lechowicz |
| 2003/0220891 A1 | 11/2003 | Fish |
| 2003/0229529 A1 | 12/2003 | Mui |
| 2004/0003112 A1 | 1/2004 | Alles |
| 2004/0006564 A1 | 1/2004 | Lucovsky |
| 2004/0006590 A1 | 1/2004 | Lucovsky |
| 2004/0010451 A1 | 1/2004 | Romano |
| 2004/0024866 A1 | 2/2004 | Sundar |
| 2004/0060002 A1 | 3/2004 | Lucovsky |
| 2004/0064571 A1 | 4/2004 | Nuuttila |
| 2004/0078273 A1 | 4/2004 | Loeb |
| 2004/0133622 A1 | 7/2004 | Clubb |
| 2004/0139145 A1 | 7/2004 | Bar-or et al. ................. 709/201 |
| 2004/0193444 A1 | 9/2004 | Hufford |
| 2004/0199663 A1 | 10/2004 | Horvitz |
| 2004/0199664 A1 | 10/2004 | Feldman |
| 2004/0199861 A1 | 10/2004 | Lucovsky |
| 2004/0199869 A1 | 10/2004 | Lucovsky |
| 2004/0205526 A1 | 10/2004 | Borodovski |
| 2004/0205656 A1 | 10/2004 | Reulein |
| 2004/0226001 A1* | 11/2004 | Teegan et al. ................. 717/120 |
| 2004/0243520 A1 | 12/2004 | Bishop |
| 2004/0267687 A1 | 12/2004 | Aschen |
| 2004/0267763 A1 | 12/2004 | Aschen |
| 2005/0013417 A1 | 1/2005 | Zimmers |
| 2005/0027741 A1 | 2/2005 | Eichstaedt |
| 2005/0065950 A1 | 3/2005 | Chaganti |
| 2005/0097000 A1 | 5/2005 | Freishtat |
| 2005/0100150 A1 | 5/2005 | Dhara |
| 2005/0165773 A1 | 7/2005 | Elvanoglu |
| 2005/0262434 A1 | 11/2005 | Soderberg |
| 2005/0273692 A1 | 12/2005 | Horvitz |
| 2005/0278344 A1 | 12/2005 | Horvitz |
| 2005/0278366 A1 | 12/2005 | Horvitz |
| 2005/0289447 A1 | 12/2005 | Hadley |
| 2006/0003780 A1 | 1/2006 | Mamdani |
| 2006/0010078 A1 | 1/2006 | Rezvani |
| 2006/0036642 A1 | 2/2006 | Horvitz |
| 2006/0107251 A1 | 5/2006 | Boshier |
| 2006/0150140 A1 | 7/2006 | Elvanoglu |
| 2006/0161554 A1 | 7/2006 | Lucovsky |
| 2007/0026857 A1 | 2/2007 | Kotzin |
| 2007/0083561 A1 | 4/2007 | Lai |
| 2007/0150903 A1 | 6/2007 | Hansen |
| 2007/0216687 A1 | 9/2007 | Kaasila |

FOREIGN PATENT DOCUMENTS

| | | |
|---|---|---|
| EP | 0 917 119 | 5/1999 |
| EP | 0 952 513 | 10/1999 |
| EP | 0991005 A2 | 4/2000 |
| EP | 1 021 021 | 7/2000 |
| EP | 1 376 977 | 8/2007 |
| EP | 1 379 971 | 2/2012 |
| JP | 11-143827 | 5/1999 |
| JP | 2000-163345 | 6/2000 |
| JP | 2002-055896 | 2/2002 |
| WO | WO 97/41654 | 11/1997 |
| WO | WO 98/38585 | 9/1998 |
| WO | WO 99/17216 | 4/1999 |
| WO | WO 99/23591 A1 | 5/1999 |
| WO | WO 00/51031 | 8/2000 |
| WO | 01/84301 | 11/2001 |
| WO | 01/86486 | 11/2001 |
| WO | WO 02/073339 | 9/2002 |
| WO | WO 02/073392 | 9/2002 |
| WO | WO 02/073442 | 9/2002 |
| WO | WO 02/073454 | 9/2002 |
| WO | WO 02/073466 | 9/2002 |
| WO | WO 02/073472 | 9/2002 |
| WO | WO 02/079921 | 10/2002 |
| WO | WO 03/096209 | 11/2003 |

(56) References Cited

FOREIGN PATENT DOCUMENTS

OTHER PUBLICATIONS

Chen Ding et al., "Selective Java Applet Filtering on Internet", IEEE, 1999, <http:// ieeexplore.ieee.org/ stamp/ stamp.jsp?tp=&arnumber= 825217>, pp. 1-5.*
Edith Cohen et al., "Improving End-to-End Performance of the Web Using Server Volumes and Proxy Filters", ACM, 1998, <http://delivery.acm.org/10.1145/290000/285286/p241-cohen.pdf> pp. 1-13.*
Shyhtsun Felix Wu, "Sleepy Security Management with Proxy-Based Filtering (A Position Paper)", North Carolina State University, 1996, <http://citeseerx.ist.psu.edu/viewdoc/download?doi=10.1.1.52.2461&rep=rep1&type=pdf> pp. 1-8.*
Karim R. Mazouni et al., "Filtering Duplicated Invocations Using Symmetric Proxies", IEEE, 1995, <http://ieeexplore.ieee.org/stamp/stamp.jsp?tp=&arnumber=470570> pp. 1-9.*
Marcos Forte et al. "A content classification and filtering server for the Internet", ACM, 2006, <http://delivery.acm.org/10.1145/1150000/1141553/p1166-forte.pdf> p. 1-6.*
Office Action mailed Dec. 18, 2007 cited in related U.S. Appl. No. 11/086,590.
U.S. Appl. No. 60/275,809, filed Mar. 14, 2001, Lucovsky et al.
Simple Object Access Protocol (SOAP) 1.1 W3C Note May 8, 2000 Don Box, DevelopMentor: David Ehnebuske, IBM: Gopal Kakivaya, Microsoft Anderw Layman, Microsoft; Noah Mendelsohn, Lotus Development Corp,; Henrik Frystyk Nielsen, Microsoft Satish Thatte, Microsoft; Dave Winer, UserLande Software, Inc. pp. 1-35. (Herein after referred to as Article 1.).
Security requirements for web-services; Author Jerbic, M.; Report Title: Position papers for World Wide Web consortium (W3C) workshop on web services; pp. 28-33 Issued by: Hewlett-Packard Lab., Bristol, UK; Publication Date: 2001 Country of Publication: UK; 50 pp. (Herein after referred to as Article 2.).
Title: A role-based access control model for XML repositories; Author Hao He; Wong, R.K. Conference Title: Proceedings of the First International Conference on Web Information Systems Engineering; Part vol. 1 p. 138-45 vol. 1 Publication Date: 2000; Country of Publication: USA; 2 vol. (xv+498+xvi+219); pp. ISBN: 0769505775; Material Identity No. XX-2000-02089 Conference Title: Proceedings of WISE 2000: 1$^{st}$ International Converfence on Web Information Systems Engineering; Conference Dat: Jun. 19-21, 2000 Conference Location: Hong Kong, China (Herein after referred to as Article 3.).
Caswell, Deborah L., "An Evolution of DCE Authorization Services," Hewlett-Packard Journal, vol. 46, No. 6, pp. 49-54, Dec. 1995. (Herein after referred to as Article 4.).
Chandramouli, Ramaswamy; "Application of XML Tools for Enterprise-Wide RBAC Implementation Tasks"; ACM Press; 2000; pp. 11-18. (Herein after referred to as Article 5.)
Vuong et al.; "Managing Security Policies in a Distributed Environment using eXtensible Markup Language (XML)" Proceddings of the 2001 ACM Symposium on Applied Computing (SAC), Mar. 11-14, 2001, Las Vegas, NV; pp. 405-411. (Herein after referred to as Article 6.).
Stallings, William; Crypotgraphy and Network Security; 1998; Prentice Hall, Inc.; Chapter 11. (Herein after referred to as Article 7.).
Barish, Greg; Untangling the Web; Intelligent Enterprise; Mar. 27, 2001; pp. 38-43. (Herein after referred to as Article 8.).
Dix, Ghris; Working With Soap, The Simple Object Access Protocol; *C/C++ Users Journal*; Jan. 2002; pp. 22-33. (Herein after referred to as Article 9.).
Jepsen, Tom; Soap Cleans Up Interoperability Problems on the Web; *IT Pro*; Jan.-Feb. 2001; pp. 52-55. (Herein after referred to as Article 10.).
X Marks the Path; JNJ Online; http://www.dnjonline.com/articles/essentials/iss25_essentials_xpath.asp;Jan. 3, 2002; 6 pgs. (Herein after referred to as Article 11.).
Soap Version 1.2 Part 1: Messaging Framework; http://www.w3.org/TR/2002/WD-soap12-part1-20011002; Nov. 30, 2001; 33 pgs. (Herein after referred to as Article 12.).
Soap Version 1.2 Part 2: Adjuncts; http://www.w3.org/TR/2001/WD-soap12-part2-20011002; Oct. 30, 2001; 43 pgs. (Herein after referred to as Article 13.).
WML Path Language (XPATH) Version 1.0; http://www.w3.org/TR/1999/REC-xpath-19991116;Oct. 30, 2001; 35 pgs. (Herein after referred to as Article 14).
Notice of Allowance mailed Jul. 9, 2007 in related U.S. Appl. No. 10/187,210.
Office Action mailed Jul. 8, 2004 cited in related U.S. Appl. No. 10/003,753.
Office Action mailed Sep. 23, 2005 cited in related U.S. Appl. No. 10/003,753.
Office Action mailed Jan. 12, 2006 cited in related U.S. Appl. No. 10/003,753.
Notice of Allowance mailed Jun. 30, 2006 cited in related U.S. Appl. No. 10/003,753.
Office Action mailed Jan. 31, 2005 in related U.S. Appl. No. 10/003,754.
Notice of Allowance mailed Jul. 12, 2005 cited in related U.S. Appl. No. 10/003,754.
Office Action mailed Sep. 26, 2005 cited in related U.S. Appl. No. 10/003,767.
Office Action mailed Jan. 25, 2006 cited in related U.S. Appl. No. 10/003,767.
Office Action mailed May 24, 2006 cited in related U.S. Appl. No. 10/003,767.
Office Action mailed Sep. 26, 2006 cited in related U.S. Appl. No. 10/003,767.
Notice of Allowance mailed Jun. 14, 2007 cited in related U.S. Appl. No. 10/003,767.
Office Action mailed Mar. 25, 2005 cited in related U.S. Appl. No. 10/062,045.
Office Action mailed Sep. 2, 2005 cited in related U.S. Appl. No. 10/062,045.
Notice of Allowance mailed Dec. 16, 2005 cited in related U.S. Appl. No. 10/062,045.
Office Action mailed May 21, 2004 cited in related U.S. Appl. No. 10/099,577.
Notice of Allowance mailed Aug. 6, 2004 cited in related U.S. Appl. No. 10/099,577.
Office Action mailed Nov. 3, 2004 cited in related U.S. Appl. No. 10/187,190.
Office Action mailed Apr. 8, 2005 cited in related U.S. Appl. No. 10/187,190.
Office Action mailed Feb. 2, 2006 cited in related U.S. Appl. No. 10/187,190.
Office Action mailed Jul. 21, 2006 cited in related U.S. Appl. No. 10/187,190.
Office Action mailed Nov. 13, 2006 cited in related U.S. Appl. No. 10/187,190.
Notice of Allowance mailed Apr. 5, 2007 cited in related U.S. Appl. No. 10/187,190.
Notice of Allowance mailed Mar. 10, 2006 cited in related U.S. Appl. No. 10/968,731.
Office Action mailed May 21, 2004 cited in related U.S. Appl. No. 10/177,470.
Notice of Allowance mailed Aug. 6, 2004 cited in related U.S. Appl. No. 10/177,470.
Office Action mailed Feb. 8, 2005 cited in related U.S. Appl. No. 10/187,210.
Office Action mailed Jul. 12, 2005 cited in related U.S. Appl. No. 10/187,210.
Office Action mailed Feb. 28, 2006 cited in related U.S. Appl. No. 10/187,210.
Office Action mailed Aug. 29, 2006 cited in related U.S. Appl. No. 10/187,210.
Office Action mailed Nov. 15, 2006 cited in related U.S. Appl. No. 10/187,210.
Office Action mailed Mar. 6, 2007 cited in related U.S. Appl. No. 10/187,210.

(56) References Cited

OTHER PUBLICATIONS

Office Action mailed Jul. 17, 2007 cited in related U.S. Appl. No. 11/086,590.
Office Action mailed Sep. 8, 2005 cited in related U.S. Appl. No. 10/186,881.
Office Action mailed Mar. 24, 2006 cited in related U.S. Appl. No. 10/186,881.
Office Action mailed Oct. 6, 2006 cited in related U.S. Appl. No. 10/186,881.
Office Action mailed Mar. 7, 2007 cited in related U.S. Appl. No. 10/186,881.
Office Action mailed Sep. 5, 2007 cited in related U.S. Appl. No. 10/186,881.
Office Action mailed Sep. 15, 2005 cited in related U.S. Appl. No. 10/003,750.
Office Action mailed Feb. 8, 2006 cited in related U.S. Appl. No. 10/003,750.
Office Action mailed Jun. 27, 2006 cited in related U.S. Appl. No. 10/003,750.
Office Action mailed Dec. 12, 2006 cited in related U.S. Appl. No. 10/003,750.
Office Action mailed Jun. 6, 2007 cited in related U.S. Appl. No. 10/003,750.
U.S. Appl. No. 10/000,837, filed Oct. 23, 2001.
U.S. Appl. No. 10/136,555, filed May 1, 2002, Elvanoglu.
U.S. Appl. No. 10/696,916, filed Oct. 30, 2003, Lai.
PR Newswire, SAFLINK's JotterSAF E-Wallet & Privacy Software Now Available for Consumer Download, Feb. 7, 2001, p. 1.
M2 Presswire, SCANSOFT: ScsnSoft's new OmniForm Premium 5.0 to Offer Businesses Powerful Forms Management, Software Convertes Paper Forms to Digital for Easy Distribution and Accurate Data Management, Oct. 16, 2001, p. 1.
PR Newswire, ScanSoft's New OmniForm Premium 5.0 to Offer Business Powerful Forms Management, Oct. 1, 2001, pp. 1-5.
Freire et al., WebViews: Accessing Personalized Web Content and Services, ACM 2001, pp. 576-586.
Office Action mailed Nov. 16, 2007 cited in related U.S. Appl. No. 10/003,750.
Advisory Action mailed Jan. 31, 2008 cited in related U.S. Appl. No. 10/003,750.
EP Communication for Application No. 02 707 934.2-1244, Reference EP25451-034/gr, Jan. 23, 2007.
EP Communication for Application No. 02 709 753.4-1244, Reference EP25449-034/gr, May 9, 2008.
EP Communication for Application No. 02 719 261.6-1244, Reference EP28364-034/df, May 2, 2008.
EP Communication for Application No. 02 721 433.7-1244, Reference EP28368-034/df, Aug. 23, 2011.
EP Communication for Application No. 02 721 433.7-1244, Reference EP28368-034/df, Oct. 16, 2009.
EP Communication for Application No. 02 725 195.8-1244, Reference EP28367-034/df, Oct. 30, 2009.
HU Advisory Action for Application No. P0301952, Reference 98855-15819 AF/CJ, Apr. 7, 2011.
ID Notice of the Result of Substantive Examination for Application No. P-00 2003 00319, Reference 167497.17, May 5, 2011.
PL Notice for Application No. P. 360329/DP, Reference Z-2375s/03, May 25, 2010.
TR Examination Report for Application No. 03/769, Jan. 18, 2010.
PCT International Search Report for Application No. PCT/US02/06243, May 7, 2002.
PCT International Search Report for Application No. PCT/US02/06244, Oct. 2, 2002.
PCT International Search Report for Application No. PCT/US02/06245, May 30, 2002.
PCT International Search Report for Application No. PCT/US02/06329, Sep. 11, 2002.
PCT International Search Report for Application No. PCT/US02/07953, Jun. 10, 2002.
PCT International Search Report for Application No. PCT/US02/08061, Aug. 22, 2002.
PCT International Search Report for Application No. PCT/US02/08063, May 30, 2002.
EP Communication for Application No. 02 707 934.2-2212, Reference EP25451-034/gr, Jun. 7, 2006.
EP Communication for Application No. 02 709 743.5-2201, Reference EP25450-034/zp, Sep. 5, 2006.
EP Communication for Application No. 02 709 753.4-1244, Reference EP25449-034/gr, Feb. 13, 2007.
EP Communication for Application No. 02 719 261.6-1244, Reference EP28364-034/df, Feb. 5, 2007.
EP Communication for Application No. 02 721 433.7-1244, Reference EP28368-034/df, Aug. 13, 2009.
EP Communication for Application No. 02 725 195.8-1244, Reference EP28367-034/df, Aug. 4, 2009.
EP Communication for Application No. 02 728 381.1-1244, Reference EP25448-034/zp, Feb. 5, 2007.
EP Communication for Application No. 03 009 717.4-1244, Reference EP27314-034/df, Dec. 2, 2003.
RU Search Report for Application No. 2003/00769, Request No. TR 04/508, Mar. 14, 2005.
DK Search Report for Application No. SG 200302729-9, Reference MH/BS/6002114SGC, Mar. 15, 2004.
NZ Examination Report for Application No. 525694, Reference P483656 MDA/akh, May 12, 2003.
"Getting Results with Microsoft Office 97", Microsoft Corporation, 1997.
"XML Path Language (XPath)", Nov. 16, 1999.
Ayers, "XML for Recourse Scheduling / Calendar Management", Nov. 8, 1998.
Bergman, "XML Technology Enables Redesigned Deep Space Network Operations", IEEE Mar. 2000.
Box, "Simple Object Access Protocol (SOAP) 1.1 ", W3C Note, May 8, 2000.
Carroll, "XML for Resource Scheduling / Calendar Management", Nov. 6, 1998.
Chu, "Web-Based Single Sign-On Solutions: An SSO Product Matrix", Computer Security Journal, Nov. 1, 2000.
Cook, "The Win2000 Active Directory", Jun. 2000.
"CORBA Components—vol. 1", Object Management Group, Jul. 1, 1999.
Eustice, "A Universal Information Appliance", IBM Systems Journal, Mar. 26, 1999.
Farjami, "Advance Service Provisioning Based on Mobile Agents", Computer Communications, Apr. 2000.
Ferreira, "Using LDAP in a Filtering Service for Digital Library", Nov. 10-12, 1997.
Gates, "Hailstorm Announcement", Bill Gates Speech, Mar. 19, 2001.
Imamura, "Metadata Representation in XML for Internet-Based Electronic XML Application from Business to Government", IEEE, Jul. 4-7, 2000.
Jingyu, "Object-Oriented Representation for XML Data", IEEE, Apr. 24, 2001.
Koppen, "Active Hypertext for Distributed Web Applications", IEEE, Jun. 16-18, 1999.
Kormann, "Risks of the Passport Single Signon Protocol", Computer Networks, Jun. 2000.
Lowry, "XML Data Mediation and Collaboration: A Proposed Comprehensive Architecture and Query Requirements for Using XML to Mediate Heterogeneous Data Sources and Targets", System Sciences, Jan. 3-6, 2001.
Magedanz, "TINA—Architectural Basis for Future Telecommunications Services", Computer Communications, Jun. 28, 1996.
Morrison, "XML Unleashed", Sam's Publishing, Dec. 21, 1999.
Padwick, "Using Microsoft Outlook 2000, Special Edition", Que Corporation, May 12, 1999.
Phelps, "Multivalent Documents: A New Model for Digital Documents", Division of Computer Science, UC Berkeley, Mar. 13, 1998.
Reinwald, "Heterogeneous Query Processing Through SQL Table Functions", ICDE, Mar. 23-26, 1999.

(56) References Cited

OTHER PUBLICATIONS

Roussev, "Integrating XML and Object-Based Programming for Distributed Collaboration", IEEE, Jun. 14-16, 2000.
Spencer, "Installing and Configuring Active Directory", Prentice Hall PTR, May 25, 2000.
Stamoulis, "Efficient Agent-Based Negotiation for Telecommunications Services", Institute of Computer Science (ICS) Foundation for Research and Technology, Dec. 5-9, 1999.
"Microsoft Outlook 2000, Step by Step", Catapult Inc., May 7, 1999.
EP Summons to attend oral proceedings for Application No. 03009717.4-1244, Reference EP27314-034/df, Oct. 18, 2006.
JP Notice of Rejection for Application No. 2003-164094, May 23, 2008.
JP Notice of Rejection for Application No. 2003-164094, Mar. 17, 2009.
JP Notice of Rejection for Application No. 2003-164094, Sep. 18, 2009.
CA Examiner's Report for Application No. 2,428,481, Apr. 2, 2009.
AU Examiner's first report on patent application No. 2003204123, Reference 12215600/DBW, Oct. 27, 2008.
CN Notice on Office Action for Application No. 03145733.9, Dec. 30, 2005.
CN the Second Office Action for Application No. 03145733.9, Nov. 2, 2007.
CN The Third Office Action for Application No. 03145733.9, Aug. 22, 2008.
KR Notice of Preliminary Rejection for Application No. 10-2003-42575, May 29, 2009.
RU Official Action for Application No. 2003119524/09(020846), Reference 2412-127800RU/3172, Aug. 15, 2007.
NO Official Action for Application No. 20032997, Dec. 23, 2008.
NO Official Action for Application No. 20032997, Sep. 28, 2009.
MY Examiner's Report for Application No. PI 20031685, Jul. 20, 2007.
ID Official Action for Application No. P-002003 00319, Mar. 3, 2006.
TR Examination Report for Application No. 2003/00769, Jun. 13, 2007.
TR Examination Report for Application No. 2003/00769, Oct. 15, 2008.
HU Novelty Search Report for Application No. P0301952, Mar. 30, 2005.
PL Notice for Application No. 360329/DP, Reference Z-2375s/03, Aug. 31, 2009.
PL Notice for Application No. 360329/DP, Reference Z-2375s103, Feb. 23, 2010.
EP Communication for Application No. 02 709 743.5-1225, Reference EP 25450-034/zp, Jun. 13, 2007.
EP Communication for Application No. 02 709 743.5-1225, Reference EP 25450-034/zp, Apr. 21, 2009.
Wang, "The SIMBA User Alert Service Architecture for Dependable Alert Delivery", Proceedings of the International Conference on Dependable Systems and Networks, Mar. 26, 2001.
Miller, "News On-Demand for Multimedia Networks", Proceedings of the First ACM International Conference on Multimedia, Aug. 1-6, 1993.
Faensen, "Hermes—A Notification Service for Digital Libraries", Proceedings of the ACM/IEEE Joint Conference on Digital Libraries, Jun. 24-28, 2001.
Huang, "Publish/Subscribe in a Mobile Environment", Proceedings of the Second ACM International Workshop on Data Engineering for Wireless and Mobile Access, May 20, 2001.

* cited by examiner

```
401A ⎯ Root
  420A ⎯ Envelope
    420A.1 ⎯ Header
    420A.2 ⎯ Body
```

```
401B ⎯ Request
  420B ⎯ Envelope
    420B.1 ⎯ Header
    420B.2 ⎯ Body
  440B ⎯ Additional Information
```

```
401C ⎯ Response
  420C ⎯ Envelope
    420C.1 ⎯ Header
    420C.2 ⎯ Body
  440C ⎯ Additional Information
```

Action Association List —600
620— Layer 1: before —620.1
620.1.1— xPathA  actionA
⋮
after —620.2
620.2.1— xPathB  actionB
620.2.2— xPathC  actionC
⋮
640— Layer 2: before —640.1
⋮
⋮ after —640.2
⋮

FIG. 6

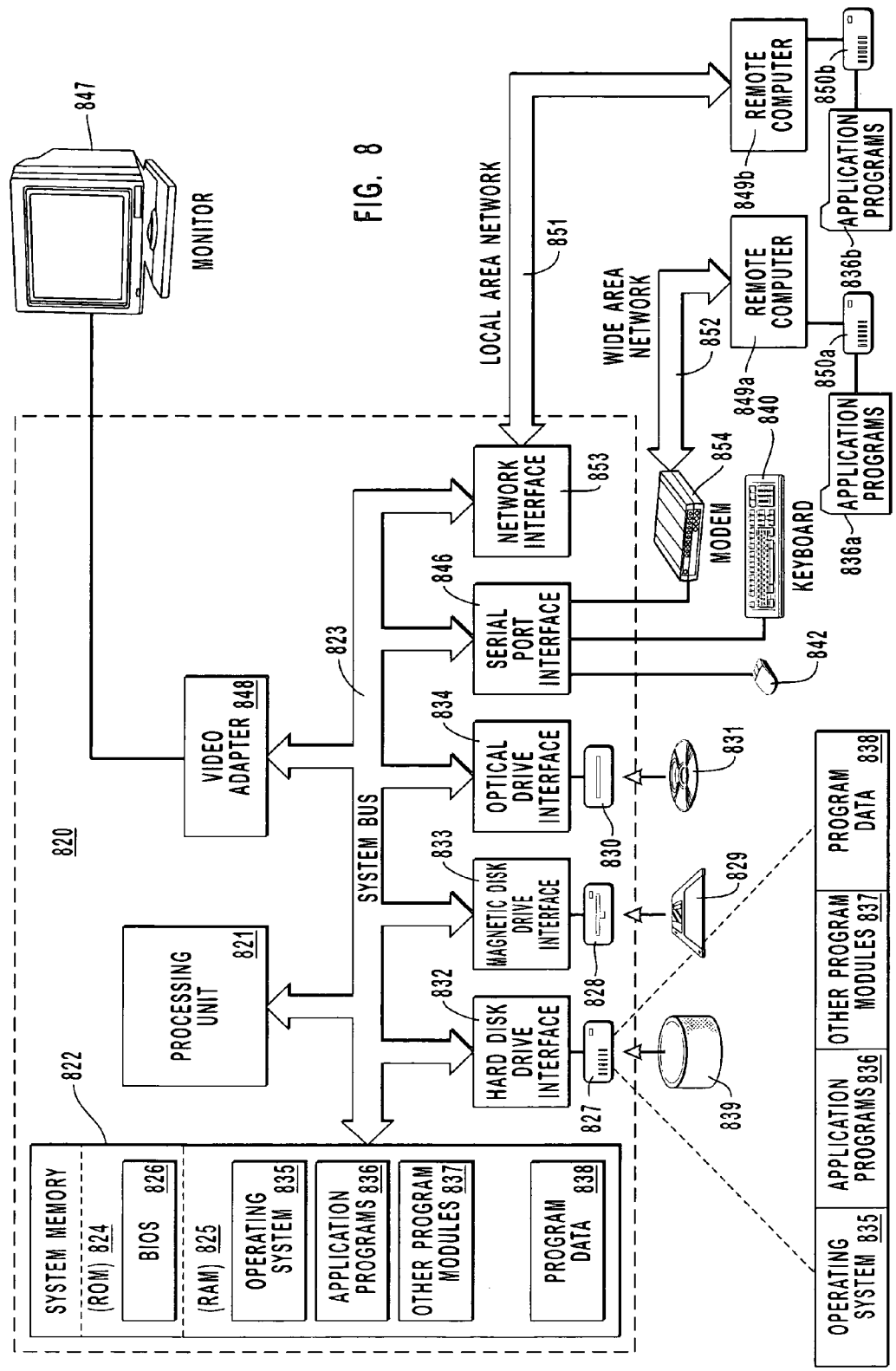

EXECUTING DYNAMICALLY ASSIGNED FUNCTIONS WHILE PROVIDING SERVICES

CROSS-REFERENCE TO RELATED APPLICATIONS

This application is a continuation of U.S. patent application Ser. No. 10/062,045, filed Jan. 31, 2002 and entitled "Executing Dynamically Assigned Functions While Providing Services", which claims priority from U.S. provisional application Ser. No. 60/275,809, filed Mar. 14, 2001 and entitled "Identity-Based Service Communication Using XML Messaging Interfaces", both of which are incorporated herein by reference. This application is also related to U.S. patent application Ser. No. 11/086,590, filed Mar. 21, 2005 and entitled "Executing Dynamically Assigned Functions While Providing Services", which is a divisional application of U.S. patent application Ser. 10/062,045. This application claims the benefit and priority of all the foregoing applications.

BACKGROUND OF THE INVENTION

1. The Field of the Invention

The present invention relates to the field of computer services. Specifically, the present invention relates to methods, systems, and computer program products for applying one or more functions during processing that may occur in a server providing one or more services.

2. Background and Related Art

Typically, before being deployed in a live system, services undergo significant testing to uncover programming errors and to evaluate performance. While useful, such testing often is able only to estimate full-scale use. As a result, certain program errors or performance problems may go undetected in development or testing environments. Finding these latent problems usually involves monitoring the operation of a service in one form or another. Furthermore, independent of programming errors or unexpected performance considerations, monitoring a service may be helpful in uncovering hardware failures and system attacks.

However, monitoring services for purposes of debugging, performance, hardware problems, system attacks, and the like, often involves various complex issues. For example, services by nature tend to be accessed by large numbers of clients. The shear volume of transactions can make monitoring services a significant exercise. Moreover, monitoring itself may introduce some amount of processing overhead. While the overhead for a single transaction is relatively small, the aggregate overhead for a large number of transactions may result in unacceptable levels of performance and skew any conclusions that are reached from the monitoring.

As a general rule, discovering problems through monitoring is an iterative process. For example, as noted above, it may be impractical to produce all possible monitoring information at all times, either due to the amount of monitoring information that will be produced or due to the negative effect that such monitoring may have on overall system performance. Therefore, monitoring often begins by detecting some type of high-level irregularity. Once discovered, the high-level irregularity may lead to more specific monitoring of increasingly specific processing or functionality until the problem's cause is discovered and corrected. After a particular problem is corrected, monitoring often returns back to the high-level system view.

In some systems, the iterative process of moving back and forth between high-level system monitoring and relatively lower level monitoring of specific service processing or functionality may require shutting services and/or servers down and restarting them. Furthermore, certain monitoring tools may require significant expertise to use, including programming skills. For many, the level of skill required may reduce the effectiveness of a particular monitoring tool or prevent its use all together. Also, monitoring tools are often specific to the environment in which they run, requiring administrators of heterogeneous systems to use different monitoring tools for each distinct system. Accordingly, methods, systems, and computer program products are desired for dynamically applying a function during any of various processing steps that may occur in providing a service to a client system.

BRIEF SUMMARY OF THE INVENTION

The present invention extends to methods, systems and computer products for dynamically executing one or more functions at any of one or more processing steps that may occur in providing a service to a client system. In one embodiment, executing the one or more functions during identified processing steps provides significant flexibility for dynamically monitoring the operation of the service being analyzed. By identifying particular processing steps that are executed during operation of the service, specific functions may be designated for execution when the processing steps occur. These specific functions are dynamically associated with the processing steps so that the type and extent of monitoring can be adjusted quickly to allow for rapid and efficient problem diagnosis.

As a processing step executes, a check is performed to determine if an operation or action is associated with the processing step. This may include evaluating whether an associated operation should be performed before the processing step or after the processing step. Then, for processing steps with an associated operation, the operation is applied in conjunction with the execution of the processing step. Typically, the processing steps are related to processing requests from clients systems that are directed to a service. In these circumstances, request for the service is received, a response to the request is generated, and the response is sent to the client.

The response and request may be organized hierarchically within a network message. One popular hierarchical organization uses eXtensible Markup Language ("XML") formatted data, with network messages being based on Simple Object Access Protocol ("SOAP"). Although binary data is contrary to the XML standard, the invention may include binary data within the hierarchical organization. For example, it may be desirable to attach certain debugging or diagnostic information to a request or response, and a binary format may be a convenient representation for that information.

Functions associated with processing steps may be predefined or custom, depending on monitoring needs or wants. Predefined functions are advantageous because certain operations or actions are likely to be commonly used in many monitoring scenarios and therefore predefined functions may provide enhanced value. By allowing for custom functions, individual monitoring circumstances may be addressed in a meaningful way. Describing at least a portion of the server system in terms of a hierarchical organization may add to the flexibility of custom functions and provide a mechanism for writing monitoring functions that are useful across multiple operating platforms. Here again, an organization based on XML may be desirable given the popularity and flexibility of the language.

Typical operations for functions may include a logging function and a filtering function. In general, logging functions write certain information to a log of some sort for analysis. Filtering functions may be used to end processing of a request and send a response to the requesting client. Among other things, logging and filtering may be useful in monitoring error conditions that occur while processing a client's request.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 6 illustrates an example organization for assigning functions to processing steps in accordance with the present invention;

FIG. 8 illustrates an exemplary system that provides a suitable operating environment for the present invention.

DETAILED DESCRIPTION OF THE PREFERRED EMBODIMENTS

The present invention extends to methods, systems, and computer program products for applying one or more operations or actions during the processing that may occur in a server providing one or more services. Through the identification of discrete processing steps that are executed while a service operates, specific operations may be executed along with each processing step. These operations are dynamically associated with the processing steps such that as a processing step executes, a check is performed to determine if any operations exists for the processing step. For processing steps that include an operation, the operation is applied during execution of the processing step.

Embodiments within the scope of the present invention may comprise one or more special purpose and/or one or more general purpose computers including various computer hardware, as discussed in greater detail below. Embodiments within the scope of the present invention also include-computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
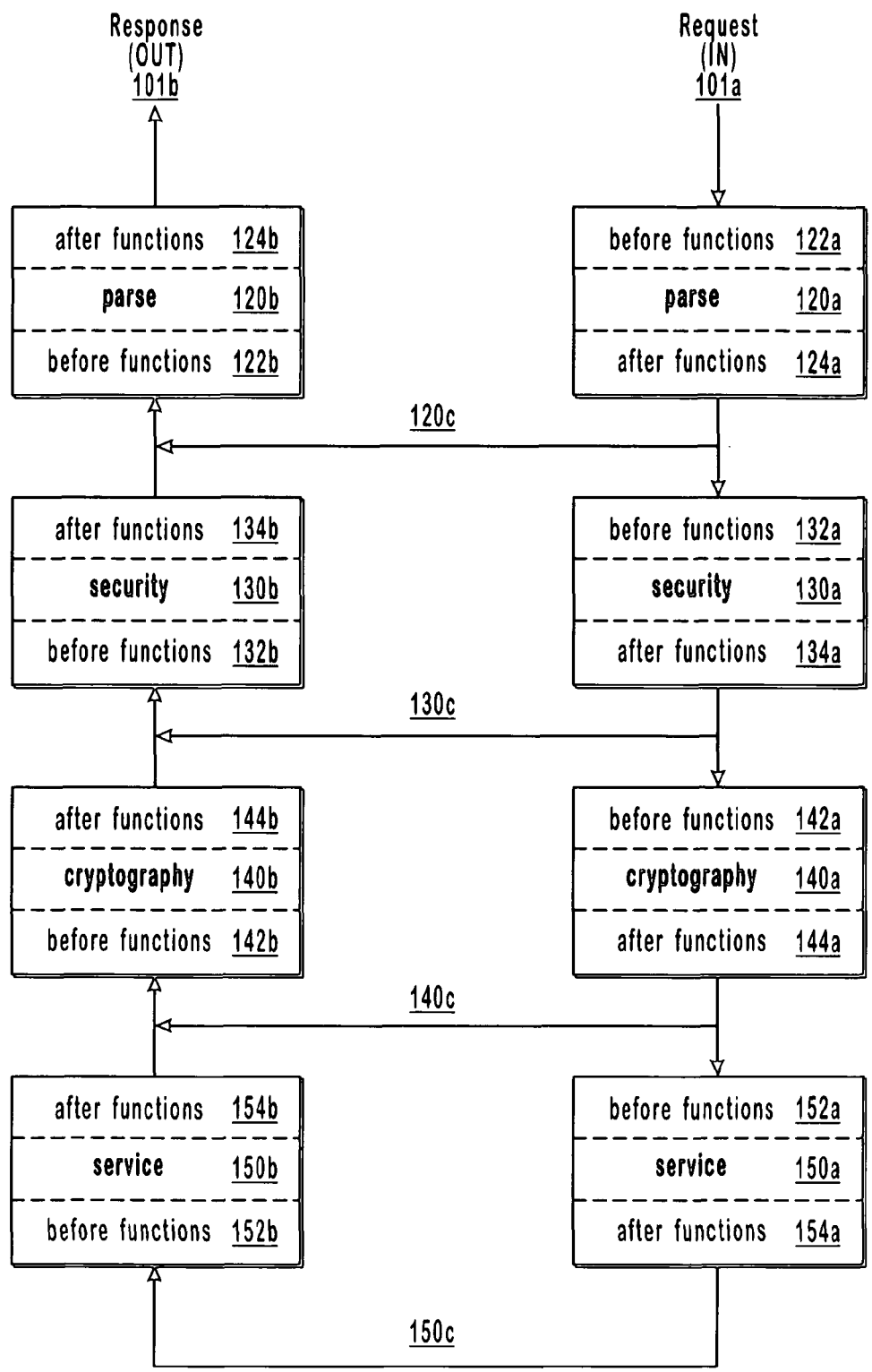
FIG. 1 is a block diagram of an example server system embodiment that operates in accordance with the present invention.

FIG. 1 shows a block diagram of an example server system that operates in accordance with the present invention. The server system uses several distinct processing layers in processing a request 101a from a client, including a parse layer, a security layer, a cryptography layer and a service layer. Each of these layers is divided into a request processing component and a response processing component. There are corresponding response and request components for each layer. Note, however, that the present invention is not necessarily limited to any particular process layering or component division.

On the request 101a, an incoming request first passes through parse component 120a. For example, parse component 120a may be used to parse a request 101a that includes XML data, such as the XML document 200A shown in FIG. 2A. By way of background, XML is a markup language that provides for data typing and namespaces. For XML document 200A, the default namespace is "x-schema:classSchema.xml" 201A(1). This informs the parser to validate the document against the schema "x-schema" at the URL "classSchema.xml."

Figure 2A:
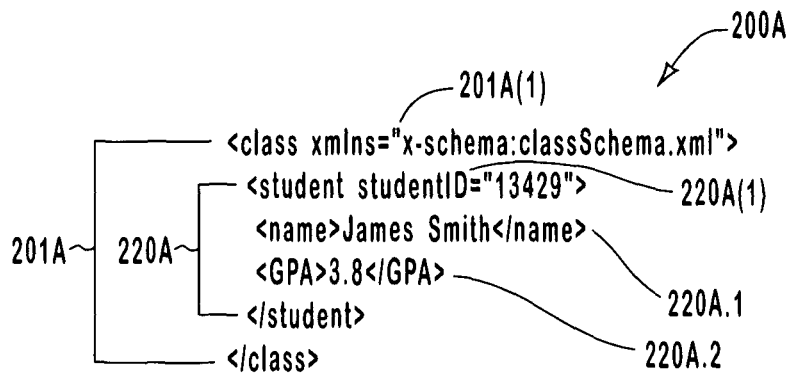
FIG. 2A shows an example XML document corresponding to the example XML schema of FIG. 2B.
Figure 2B:
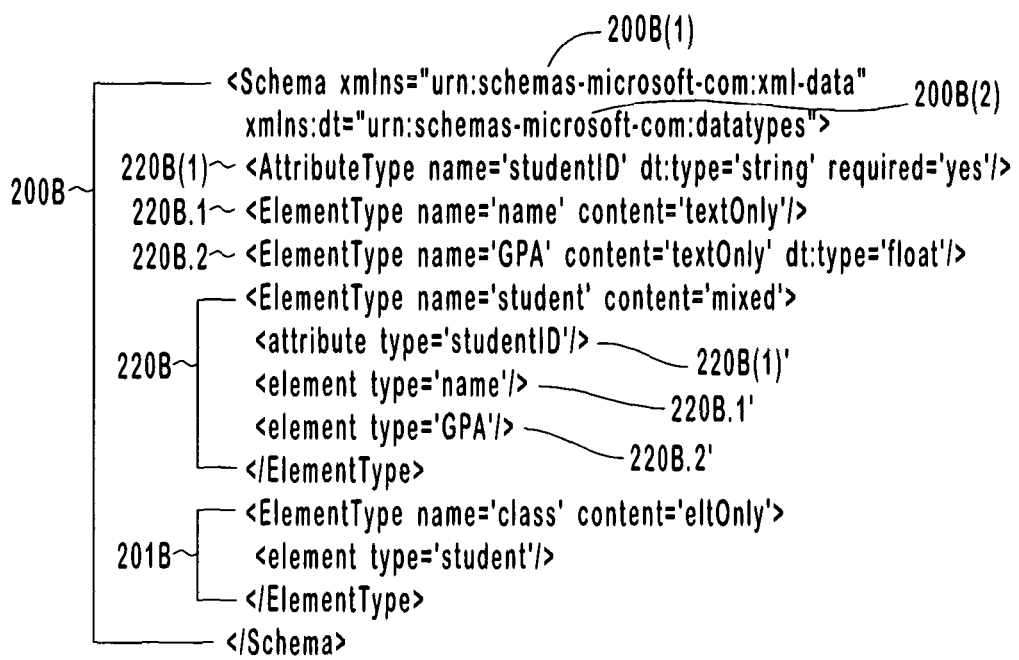
FIG. 2B illustrates an example XML schema corresponding to the example XML document of FIG. 2A.

FIG. 2B shows the entire schema for the document of FIG. 2A. The top level of the schema is <Schema></Schema> element pair 200B that contains the declaration of the schema namespace and, in this case, the declaration of the "datatypes" namespace as well. The first, "xmlns="urn:schemas-microsoft-com:xml-data"," 200B(1) indicates that this XML document is an XML Schema. The second, "xmlns:dt="urn:schemas-microsoft-com:datatypes"," 200B(2)

allows for typing element and attribute content by using a "dt" prefix on the type attribute within their ElementType and AttributeType declarations.

"ElementType" assigns a type and conditions to an element, and what, if any, child elements it can contain; "AttributeType" assigns a type and conditions to an attribute; "attribute" declares that a previously defined attribute type can appear within the scope of the named ElementType element; and "element" declares that a previously defined element type can appear within the scope of the named ElementType element. The content of the schema begins with the AttributeType and ElementType declarations of the innermost elements, namely:

| | |
|---|---|
| <AttributeType name='studentID' dt:type='string' required='yes'/> | 220B(1); |
| <ElementType name='name' content='textOnly'/> and | 200B.1; |
| <ElementType name='GPA' content='textOnly' dt:type='float'/> | 200B.2. |

The next ElementType declaration is followed by its attribute and child elements. When an element has attributes or child elements, they are in its ElementType declaration. They also are previously declared in their own ElementType or AttributeType declaration. In particular,

| | |
|---|---|
| <ElementType name='student' content='mixed'> | 220B; |
|    <attribute type='studentID'/> | 220B(1)'; |
|    <element type='name'/> | 220B.1'; |
|    <element type='GPA'/> | 220B.2'; and |
| </ElementType> | 220B. |

The process is continued throughout the rest of the schema until every element and attribute has been declared:

| | |
|---|---|
| <ElementType name='class' content='eltOnly'> | 201B; |
|    <element type='student'/> | ; |
| </ElementType> | 201B. |

Notice that the reference numbers for the XML document shown in FIG. 2A correspond to the schema declarations in FIG. 2B. Specifically,

| | |
|---|---|
| <class xmlns="x-schema:classSchema.xml"> | 201A; |
|    <student studentID="13429"> | 220A; |
|       <name>James Smith</name> | 220A.1; |
|       <GPA>3.8</GPA> | 220A.2; |
|    </student> | 220A; |
| </class> | 201A. |

Figure 3A:
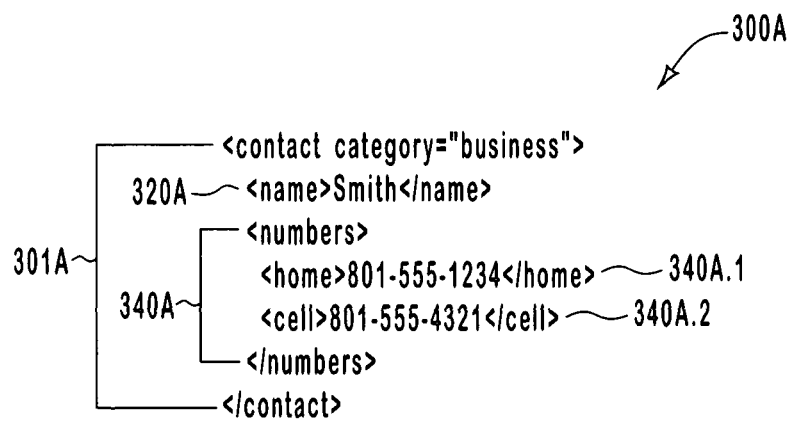
FIG. 3A shows an example XML document corresponding to the example xPath statement of FIG. 3B.
Figure 3B:
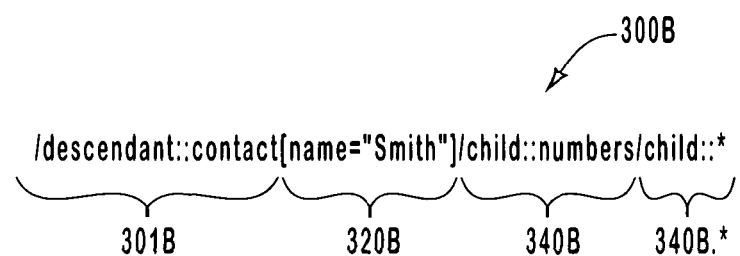
FIG. 3B illustrates an example xPath statement corresponding to the example XML document of FIG. 3A.

The example XML document 300A in FIG. 3A will be used in conjunction with the xPath statement 300B shown in FIG. 3B. In general, xPath uses abstract document relationships in identifying parts of a document. For example, the xPath statement 300B locates Smith's numbers within the XML document 300A. Similar to FIGS. 2A and 2B, notice that the reference numbers for the XML document 300A of FIG. 3A correspond to xPath statement 300B of FIG. 3B.

Specifically, the "/descendant::contact" portion 301B of the xPath statement 300B maps to descendants of the <contact> </contact> tag pair 301A. The "[name="Smith"]" portion 320B selects the "<name>Smith</name>" 320A contact entry, and the "/child::numbers" portion 340B selects the <numbers> </numbers> children of contact 301A. "/child::*" identifies the specific children (i.e., "<home>801-555-1234</home>" 340A.1 and "<cell>801-555-4321</cell>" 340A.2) that are of interest. (The star or asterisk is a wildcard indicating that all children are of interest.)

Referring back to FIG. 1, parse component 120a includes before functions 122a that are executed prior to parse component 120a and after functions 124a that are executed after parse component 120a. Path 120c shows that processing may proceed to parse 120b on the response side following the operation of parse component 120a. Proceeding to parse 120b following parse 120a may be the result of a parse error or may be dictated by before functions 122a or after functions 124a, in which case it makes little sense to continue on to security 130a. For example, after at least some parsing, after functions 124a may be able to determine that some problem exists with the request 101a. After functions 124a may determine that request 101a is part of a denial of service attack or that request 101 a includes content or originates from a source that is blocked for some reason, such as inappropriate material or spam.

Parse component 120a may indicate that processing should continue with security component 130a. Security component 130a determines the identity associated with the request 101a. In one embodiment, this involves determining an application identifier, a user identifier, and a platform identifier for request 101a, because the service layer provides storage and access to data that is identity specific. For example, a user may access the service layer for email, calendar items, contacts, etc., using both a PC and a handheld device. The security layer, and security component 130a, determines the appropriate identity so that data and operations are appropriate to the device being used for access. Similarly, different users may be allowed different access to the same data. For example, an owner might be able to add, delete, and modify data, whereas a delegate may only have read privileges. The type of access permitted is controlled by role list database that contains various rules for determining access rights. Nevertheless, as noted the present invention does not necessarily require a security layer, and if one is present, it need not operate as security component 130a. A failure in the security layer may result in proceeding along path 130c or assigning default access privileges.

It may seem somewhat redundant to allow for both after functions 124a in parse component 120a and before functions 132a in security component 130a. However, because processing may proceed along path 120c, functions 132a will not necessarily be invoked for a request 101a. Further, associating functions closely with a particular layer provides for greater clarity as to when the function will be executed. A similar analysis holds true for after functions 134b of security component 130b and before functions 122b of parse component 120b. It should be emphasized, nevertheless, that the present invention does not necessarily require the specific association of functions with processing steps that is shown in FIG. 1. Therefore, the assignment of functions to processing steps should be interpreted broadly to cover a wide range of function associations. From security component 130a, processing proceeds to either security component 130b or to cryptography component 140a.

Similar to other components, cryptography component 140a includes before functions 142a and after functions 144a. Cryptography component 140a is responsible for any decryption that is needed for request 101a. In one embodiment, request 101a is a Simple Object Access Protocol ("SOAP") request, conforming to the hierarchy 400A illustrated in FIG. 4A. Basically, a SOAP message includes an envelope 420A with a header 420A.1 and a body 420A.2, where the envelope 420A is at the root level 401A.

Figure 4A:
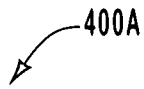
FIG. 4A depicts the hierarchy of an example SOAP message.
Figure 4B:
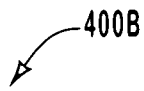
FIG. 4B shows the request portion of an overall example hierarchy illustrated in FIG. 5.
Figure 4C:
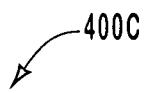
FIG. 4C shows the response portion of an overall example hierarchy illustrated in FIG. 5.
Figure 5:
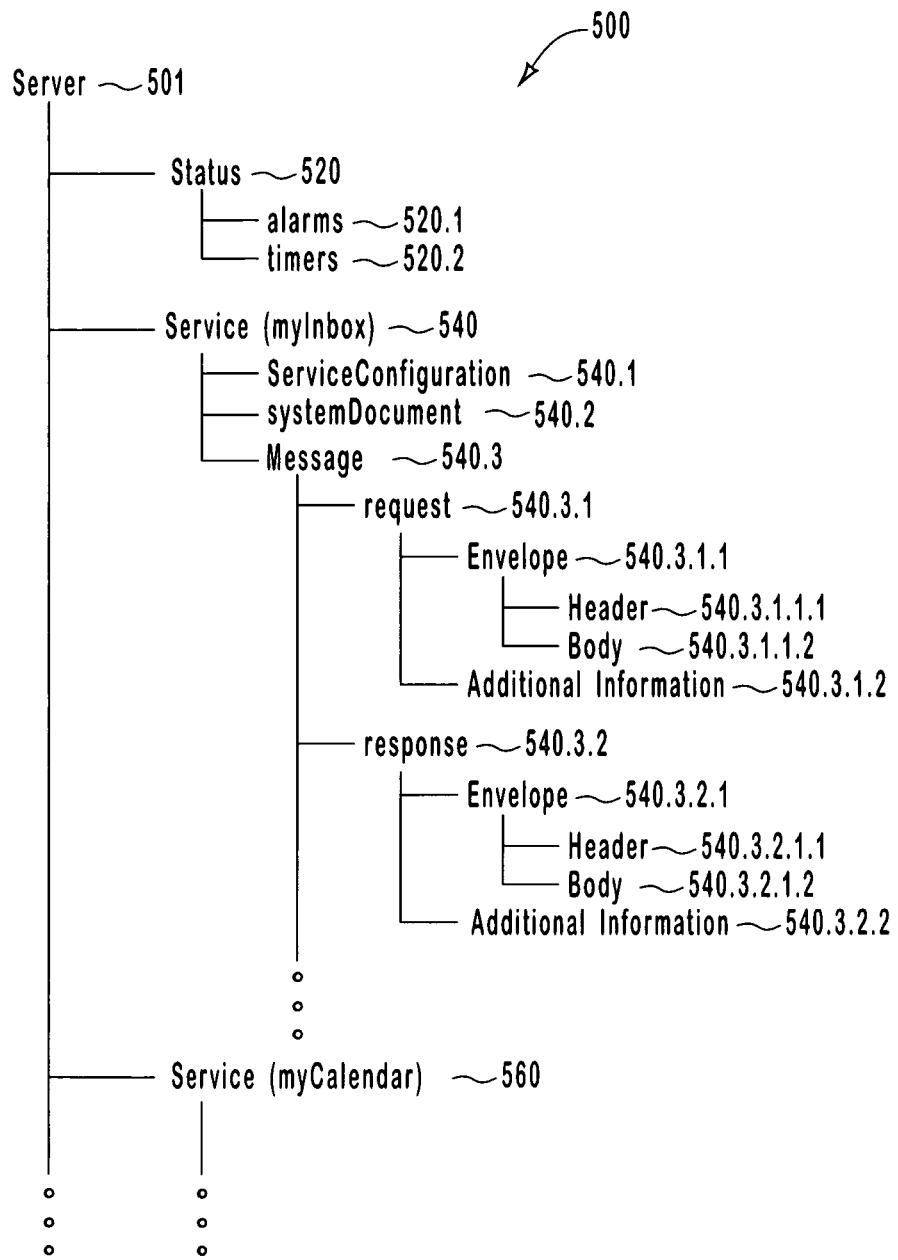
FIG. 5 shows a more complete portion of a hierarchal organization for message processing corresponding to the example server system embodiment of FIG. 1.

FIG. 4B shows the request portion and FIG. 4C shows the response portion of an overall example hierarchy illustrated in FIG. 5. Here too, references have been selected so that corresponding portions are FIGS. 4A, 4B, and 4C are similarly numbered. The example hierarchy illustrated in FIG. 5 will be described in greater detail below. It should be noted that in FIG. 4B, envelope 420B is at the request level 401B (rather than the root level) and that the request level 401B includes additional information 440B. Envelope 420B continues to include header 420B.1 and body 420B.2. Likewise, in FIG. 4C, envelope 420C is at the response level 401C (rather than the root level) and the response level 401C includes additional information 440C. Envelope 420C continues to include header 420C.1 and body 420C.2. Adding the request level 401B and the response level 401C removes ambiguity from the single root level 401A that is illustrated in FIG. 4A. As a result, it is clear whether a locator statement such as an xPath statement references a request 101a or response 101b (both of FIG. 1), without the need to determine the processing context of the xPath statement. The additional information 440B and 440C may be used to store information that may be helpful in monitoring a service. The additional information may comprise binary data, including a data structure or data object. For example, additional information 440C may contain a detailed error chain. The present invention is not limited to any particular type or format of additional information.

Returning now to FIG. 1, the body of a SOAP request is encrypted, so cryptography component 140a performs the necessary decryption. Those of skill in the art will recognize that there is not much value to parsing an encrypted SOAP body. Therefore, parse 120a may be limited initially to those portions of request 101a that are not encrypted. Then, following cryptography 140a, parse component 120a may continue with the decrypted portions of request 101a. At this point, it is worth noting that the flow from layer to layer need not be strictly sequential to fall within the scope of the present invention. A cryptography failure will result in proceeding with processing along path 140c.

Following cryptography 140a, processing proceeds to service 150a and before functions 152a and after functions 154a. Service 150a represents the processing that carries out the methods that may be included with request 101a. For example, request 101a may attempt to query, insert, replace, update or delete data maintained by service 150a, such as email, calendar items, contacts, spreadsheet, word processing documents, or the like. Although described as a data store that is manipulated with XML, the present invention is not necessarily limited to any particular type or service, or any particular access mechanism for identity-specific data.

Turning next to the processing for response 101b, service component 150b prepares an appropriate response to the methods that may be included with request 101a. For example a response may include data that is queried or indicate whether an insert, update, replace, or delete operation was successful or failed. Failures may include error codes of some sort, with more substantial debugging or error information in the response's additional information 440C (FIG. 4C). Service component 150b includes before functions 152b and after functions 154b. Notice that the ordering of the before functions and after functions on the response side is opposite the ordering on the request side because the flow from layer to layer is reversed.

Cryptography component 140b follows service component 150b or path 140c from cryptography 140a. As indicated earlier, the body of a SOAP message is encrypted. For response 101b, the cryptography layer, and cryptography component 140b in particular, performs the encryption. Note that service component 150b and cryptography component 140b essentially perform analogous or complementary functionality for the corresponding service component 150a and cryptography component 140a of the respective layers.

The present invention, however, does not necessary require analogous or complementary functionality in each layer. For example, there is no analogous or complementary functionality provided by security 130b. Nevertheless, it may still be desirable to allow for before functions 132b and after functions 134b, whether processing flowed from cryptography component 140b or from security component 130a through processing path 130c.

Like security component 130b, there is no analogous or complementary function of parse component 120a to be performed by parse component 120b. Still, before functions 122b and after functions 124b may provide desirable functionality in some circumstances. Both parse component 120b and security component 130b may simply pass whatever is present in response 101b to the next level.

At this stage, it may be worth identifying some types of functions that may be applicable to each processing layer. Two examples of commonly applicable functions are logging and filtering. Logging is generally associated with monitoring, although not exclusively so. For performance, debugging, identifying hardware problems, detecting system attacks, and the like, logging may provide valuable information for each layer (both prior to and following execution of the layer). Filtering relates to terminating further processing, usually with respect to a request. Filtering might include detecting a denial of service attack or other type of attack, preventing access to certain content, such as pornographic material, stopping spam or other unsolicited interaction, or the like.

FIG. 5 shows a more complete portion of a hierarchal organization for message processing corresponding to the example server system embodiment of FIG. 1. Server 501 identifies at least one server that is responsible for providing one or more services. Note that server 501 provides services for messages directed to myInbox (540), messages directed to myCalendar (560), and messages directed to other services. In some circumstances it may be desirable for a single server to provide multiple services whereas in other circumstances it may be desirable for a server to provide only one service. In addition, a single server may be made up of multiple computers and multiple servers may be used to provide a single service. The present invention does not require any particular hardware configurations and each of the foregoing examples, including combinations thereof, is an example of a server system and should be included within the scope of the present invention.

Server 501 includes various status indicators 520, including alarms 520.1 and timers 520.2. These status indicators may be used by any of the processing layers shown in FIG. 1. Within myInbox 540, service configuration 520.3 and system document 520.4 contain configuration information, security information, identity information, and other data that may be necessary or useful a service. As noted earlier, for a particular message, such as message 540.3, request 540.3.1, with envelope 540.3.1.1, header 540.3.1.1.1, body 540.3.1.1.2, and additional information 540.3.1.2, and response 540.3.2, with envelope 540.3.2.1, header 540.3.2.1.1, body 540.3.2.1.2, and additional information 540.3.2.2, correspond to FIGS.

4B and 4C, respectively. FIG. 5 is one example of describing at least a portion of a server system in accordance with an XML schema. However, it should be emphasized that many other hierarchical arrangements are possible and that the present invention is not limited to any particular description.

FIG. 6 illustrates an action association list 600 for assigning functions to processing steps in accordance with the present invention. Action association list 600 identifies a layer 1 620 processing step, a layer 2 640 processing step, and other layer processing steps. Layer 1 620 processing step specifies whether a particular action should be executed before 620.1 layer 1 or after 620.2 layer 1. Prior to execution of layer 1, if xPathA 620.1.1 is present in the XML hierarchy 500 shown in FIG. 5, actionA is applied. Similarly, after execution of layer 1, if xPathB 620.2.1 is present in the XML hierarchy 500, actionB is applied, and if xPathC 620.2.2 is present in the XML hierarchy 500, actionC is applied. Depending on how actionB is defined, it is possible for xPathC to either be ignored or processed. Although no details are shown, before 640.1 and after 640.2 of layer 2 640 operate in an analogous fashion.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 7A:
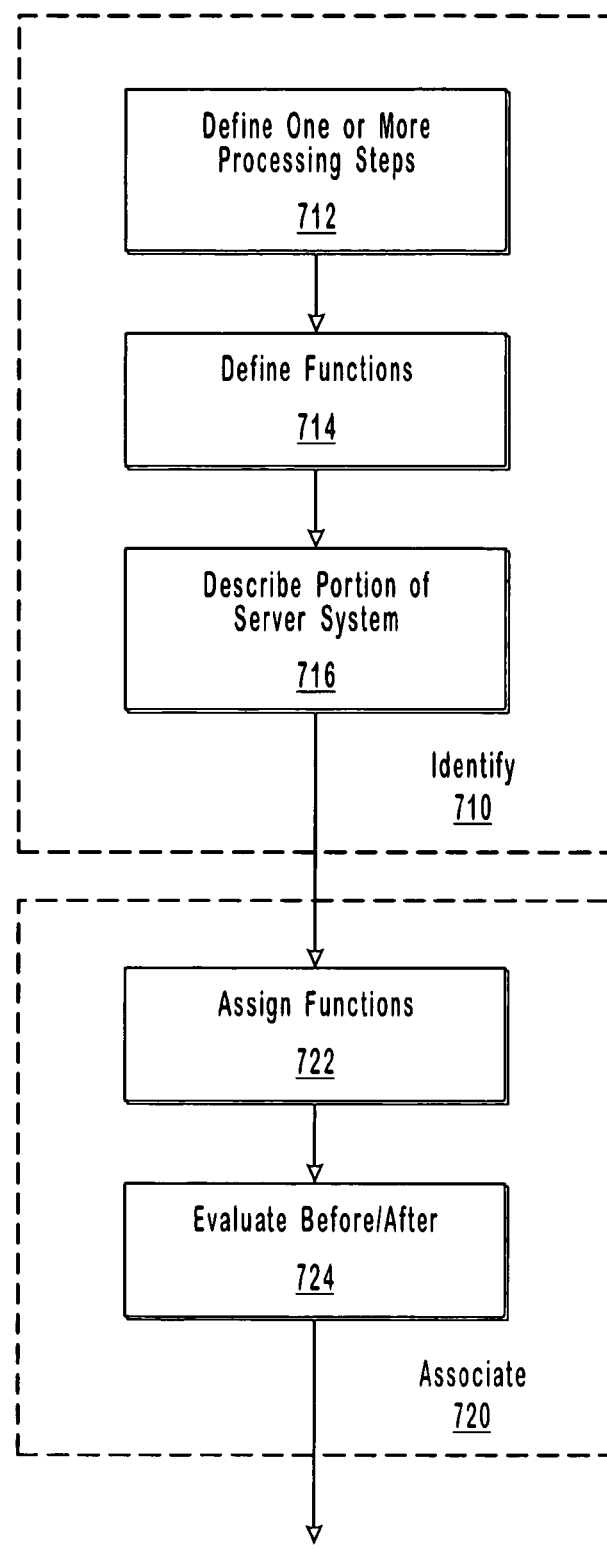
FIGS. 7A-7B show a flowchart of a method for executing one or more functions at any of one or ore processing steps in accordance with the present invention.
Figure 7B:
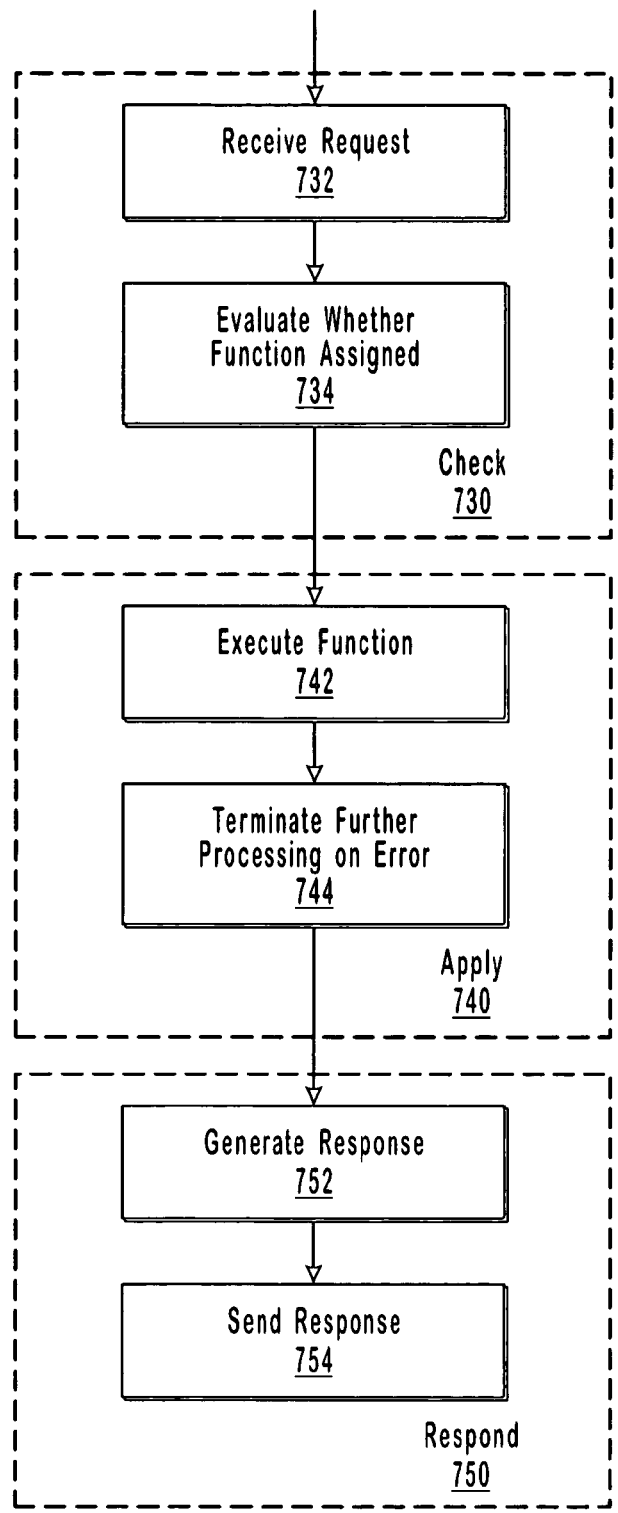

FIGS. 7A and 7B are a flow diagram that describe various acts and steps for methods according to the present invention. A step for identifying (710) one or more functional processing blocks where one or more operations or actions may be applied to one or more requests directed to one or more services may include acts of: defining (712) one or more processing steps within a server system that provides one or more services; defining (714) one or more functions that may be executed at any of the one or more processing steps; and describing (716) at least a portion of the server system in accordance with an XML schema. An act of defining (714) one or more functions should be interpreted broadly to include selecting a predefined function or creating a new function.

It should be noted that the terms such as "service," "processing step," "functional processing block," "operation," "function," and "action" should be interpreted broadly to encompass a wide variety of computer processing. Often, the term "service" is used as a generic reference for some type of computer resource. For example, an embodiment of the present invention is described in the context of an overall service that provides access to identity-based data, with one or more individual services within the overall service being dedicated to particular types of data, such as email, contacts, calendar, tasks, documents, etc. As used in this application, therefore, "service" is not necessarily limited to any particular type of computing resource, and any service specifically identified should be interpreted merely as an example.

Similarly, the terms "processing step," "functional processing block," "operation," "function," and "action" are often used as generic references for some division or grouping of one or more computer instructions that accomplish a particular task. With reference to the service that provides access to identity-based data, "processing steps" and "functional blocks" generally are associated with the parsing, security, cryptography, and service operations, whereas "operations," "functions," and "actions" generally are associated with logging and filtering. Nevertheless, each of the foregoing terms is used throughout the application in a generic sense. The general associations identified above, therefore, should not necessarily be interpreted as limiting any of these terms to the specific examples used merely in describing an embodiment of the present invention. As such, "processing step," "functional processing block," "operation," "function," and "action" should not be limited to any particular division or grouping of computer instructions, and any more specific description should be understood simply to represent an example.

A step for dynamically associating (720) at least one operation or action for at least one of the one or more functional processing blocks may include acts of: assigning (722) at least one function to at least one of one or more processing steps; and an act of evaluating (724) whether the at least one dynamically assigned function should be executed either before or after the at least one of the one or more processing steps. A step for checking (730) whether or not any action has been associated with a particular functional processing block during execution of the particular functional processing block may include acts of: receiving (732) a request for one or more services from a client system; and evaluating (734) whether or not any function has been assigned to a processing step.

A step for applying (740) one or more associated operations or actions during execution of any function processing block with one or more associated actions may include acts of: executing (742) at least one assigned function at each processing step that has at least one assigned function; and terminating (744) any further processing on a request received from a client system. A step for responding (750) to a client system based on a request for one or more services from a client system may include acts of: generating (752) a response; and sending (754) the response to the client system.

Having now described the principles of the present invention in detail, it is noted that the precise hardware configuration that implements the above-described features is not important to the present invention. For example, it is not important to the principles of the present invention where the various components of FIG. 1 are implemented.

Nevertheless, for the sake of completeness, FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an exemplary system for implementing the invention includes a general purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 1. The logical connections depicted in FIG. 1 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server system configured to provide a service, the server system comprising at least one computer-readable storage medium that is not a signal or carrier wave parse, that stores computer-executable instructions that, when executed by a processor of the server system, cause the server system to perform a method for dynamically executing one of a plurality of functions at any of a plurality of processing blocks that are performed by the server system in providing the service to at least one client system, wherein the method comprises:

defining, in response to a request from a client system of the at least one client system, the plurality of processing blocks that are performed by the server system in providing the service, the plurality of processing blocks defined within a plurality of processing layers of the service, the plurality of processing layers including at least a parsing layer atop a security layer atop a cryptography layer atop a service layer, where each of the plurality of processing layers includes a request processing component and a response processing component, where the request processing component of the parsing layer is configured for parsing the request and for indicating that processing is to continue with the response processing component of the parsing layer or with the request processing component of the security layer that is configured for determining an identity associated with the request and for indicating that the processing is to continue with the response processing component of the security layer or with the request processing component of the cryptography layer that is configured for decrypting the request and for indicating that the processing is to continue with the response processing component of the cryptography layer or with the request processing component of the service layer that is configured for performing a method indicated by the request for indicating that the processing is to continue with the service response component; and dynamically assigning, by the server system in response to the defining, at least one of the plurality of functions to at least one of the plurality of processing blocks, wherein the plurality of functions is configured to include predefined functions, custom functions, logging functions, and filtering functions, wherein the dynamically assigning is based on an action association list that indicates which of the plurality of functions is to be assigned to which of the plurality of processing blocks, and that further indicates whether an assigned one of the plurality of functions is to be assigned to be executed before or after its corresponding assigned one of the plurality of processing blocks, wherein the action association list identifies various of the plurality of processing blocks within various of the plurality of processing layers of the service, wherein the action association list specifies some of the plurality of functions to be executed before some of the plurality of processing blocks, and wherein the action association list further specifies others of the plurality of functions to be executed after others of the plurality of processing blocks.

2. A server system as recited in claim 1, the method further comprising evaluating whether the at least one dynamically assigned function should be executed either before or after the at least one of the plurality of processing blocks.

3. A server system as recited in claim 1, wherein the plurality of processing blocks enable processing requests from the at least one client system, and wherein the method further comprises:
receiving, from the client system, the request for the service;
generating, in response to the request and by the service, a response; and
sending the response to the client system.

4. A server system as recited in claim 3, wherein the request and the response comprise data organized hierarchically within a network message, and wherein the hierarchically organized data comprises extensible Markup Language ("XML") formatted data, and wherein the network message comprises a Simple Object Access Protocol ("SOAP") network message.

5. A server system as recited in claim 4, wherein the hierarchically organized data comprises binary data.

6. A server system as recited in claim 1, wherein the server system comprises an eXtensible Markup Language ("XML") data repository configured to provide access to XML data based on identity information that is received with the request from the client system.

7. A server system as recited in claim 1, wherein the method further comprises describing at least a portion of the server system in accordance with an eXtensible Markup Language ("XML") schema.

8. A server system as recited in claim 7, wherein the plurality of layers further comprise a security layer, a cryptography layer, and a service layer.

9. A server system as recited in claim 1, the method further comprising:
executing, in response to the request, one of the plurality of processing blocks and its corresponding assigned one of the plurality of functions;
detecting, based on the executed assigned of the plurality of functions, a filtering condition;
terminating, based on the detecting, any further processing of the request; and
generating a response that includes information about the detected filtering condition.

10. A server system as recited in claim 1, wherein the parsing layer is configured to determine that there are errors with the request.

11. A method comprising: identifying a plurality of functional processing blocks that are each identified within a plurality of processing layers of a service provided by a server system that is a computing device, the plurality of processing layers including at least a parsing layer atop a security layer atop a cryptography layer atop a service layer, where each of the plurality of processing layers includes a request processing component and a response processing component, where the request processing component of the parsing layer is configured for parsing the request and for indicating that processing is to continue with the response processing component of the parsing layer or with the request processing component of the security layer that is configured for determining an identity associated with the request and for indicating that the processing is to continue with the response processing component of the security layer or with the request processing component of the cryptography layer that is configured for decrypting the request and for indicating that the processing is to continue with the response processing component of the cryptography layer or with the request processing component of the service layer that is configured for performing a method indicated by the request for indicating that the processing is to continue with the service response component; and dynamically associating, by a computer in response to the identifying, at least one of a plurality of functions with at least one of the plurality of processing blocks, wherein the plurality of functions is configured to include predefined functions, custom functions, logging functions, and filtering functions, wherein the filtering functions are each configured to terminate further processing based on content in a request, wherein the dynamically associating is based on an action association list that indicates which of the plurality of filtering functions is to be assigned to which of the plurality of functional processing blocks, wherein the action association list identifies various of the plurality of processing blocks within various of the plurality of processing layers of the service, wherein the action association list specifies some of the plurality of functions to be executed before some of the plurality of processing blocks, and wherein the action association list further specifies others of the plurality of functions to be executed after others of the plurality of processing blocks.

12. A method as recited in claim 11, wherein the dynamically associating comprises evaluating whether each of the plurality of filtering functions is to be applied before or after its assigned of the plurality of functional processing blocks.

13. A method as recited in claim 11, wherein the method further comprises responding to a client system in response to a request from the client system for a service.

14. A method as recited in claim 11, wherein a request from a client system and a response to the client system each comprise data organized hierarchically within a network message, the hierarchically organized data comprising eXtensible Markup Language ("XML") formatted data, and the network message comprising a Simple Object Access Protocol ("SOAP") network message.

15. A method as recited in claim 11, wherein the server system comprises data that can be manipulated with eXtensible Markup Language ("XML"), and wherein access to the data is governed by the identity of the requestor.

16. A method as recited in claim 11, wherein the server system comprises a plurality of processing layers, and wherein the plurality of layers comprise at least one of a security layer, a cryptography layer, and a service layer, and wherein each of the plurality of filtering actions is configured to terminate processing of the request wherein the request includes spam or pornographic material or unsolicited content.

17. A method as recited in claim 11, wherein the method further comprises dynamically disassociating at least one of the plurality of filtering functions from at least one of the plurality of functional processing blocks.

\* \* \* \* \*